United States Patent [19]
Arai

[11] Patent Number: 6,061,314
[45] Date of Patent: May 9, 2000

[54] OPTICAL DISC DEVICE REPRODUCING INFORMATION ACCORDING TO REPRODUCTION SPEED INFORMATION

[75] Inventor: Shinichi Arai, Fukushima, Japan

[73] Assignee: Nippon Columbia Co., Ltd., Tokyo, Japan

[21] Appl. No.: 08/956,779

[22] Filed: Oct. 23, 1997

[30] Foreign Application Priority Data

Oct. 30, 1996 [JP] Japan .................................... 8-303999

[51] Int. Cl.⁷ ...................................................... G11B 7/00
[52] U.S. Cl. ................................. 369/48; 369/50; 369/58
[58] Field of Search ................................. 369/48, 47, 49, 369/50, 54, 58, 59, 60, 32, 124

[56] References Cited

U.S. PATENT DOCUMENTS 5,142,521   8/1992   Terashima et al. ........................ 369/50

FOREIGN PATENT DOCUMENTS

7-296511   11/1995   Japan .
8-138320   5/1996   Japan .

*Primary Examiner*—Muhammad Edun
*Attorney, Agent, or Firm*—Young & Thompson

[57] ABSTRACT

An optical disc device in which a reproduction speed of audio information recorded in a track (or disc) of a mini-disc (MD) etc. can be easily changed. Reproduction speed information is recorded in a track name area (or disc name area) of UTOC area of an MD etc. At the time of reproduction, the audio information is reproduced at a speed according to this reproduction speed information code. As a result, it is possible to reproduce audio information at a speed according to the reproduction speed information code, for each track (or each disc).

12 Claims, 4 Drawing Sheets

System Diagram of Optical Disc Drive of the Present Invention

FIG. 2

Track Name Area of UTOC Sector No. 1

FIG. 3 n1: Track Name (ASCII)
n2: Null Character Code Indicating End of Track Name
n3: Reproduction Speed Information Code
n4: Track Number
n5: Null Character Code
n6: Final Null Character Code Contents of Track Name Area of UTOC Sector No. 1

FIG. 4

Flowchart at Recording

FIG. 5

Flowchart at Reproduction

OPTICAL DISC DEVICE REPRODUCING INFORMATION ACCORDING TO REPRODUCTION SPEED INFORMATION

BACKGROUND OF THE INVENTION

1. Field of the Invention

The present invention relates to an optical disc device for recording and reproducing audio information or the like onto and from an optical disc, and particularly to an optical disc device adapted to be able to record and reproduce, in a track name area for table-of-contents information, reproduction speed information indicating reproduction speed.

2. Description of Related Art

Conventionally, an optical disc device for recording or reproducing audio information onto or from a magnet-optical disc such as mini-disc (MD) is adapted to be able to perform pitch control for varying pitch (musical interval) of audio information to be reproduced or recorded. Such an optical disc device is disclosed in Japanese Patent Application Publication (KOKAI) No. 8-138320, for example.

The above publication discloses the optical disc device which can widely control the reproduction speed of audio information from an operating section of the device without being affected by the clock extraction ability of a PLL (Phase-Locked Loop).

Further, in broadcasting stations or the like, recording and reproducing devices are widely used which control the reproduction speed of a musical piece to bring broadcasting of the musical piece to an end within a given time.

In the above-described optical disc device which varies the pitch of audio information by means of the conventional pitch control, a pitch control operation should be performed each time audio information is reproduced.

Accordingly, in the case of a CD or the like, in which a number of pieces of music are recorded on one optical disc, the reproduction time should be adjusted for each piece of music by operating a pitch controller at the time of reproduction.

Further, in the above-described conventional reproduction device widely used in broadcasting stations, different optical discs should be replaced one by one as reproduced, at the time of musical broadcasting. In that case, each time an optical disc to be reproduced is exchanged, the reproduction speed must be adjusted. Only one error in the adjustment of reproduction time can give rise to a problem that a given music program does not end within its broadcasting time.

An object of the present invention is to provide an optical disc device which can control the reproduction speed of audio information or the like for each track or for each disc with a simple operation.

To attain the above object, according to the present invention, an optical disc device which can record and reproduce audio information onto and from an optical disc, comprises:

operating means capable of designating a reproduction speed;

recording means for recording, together with track name information, reproduction speed information designated by the operating means, into a track name area of the TOC (Table of Contents) area, wherein the table-of-contents information contains track reproduction starting position information and track reproduction ending position information for the audio information recorded thereon, and control means for controlling the reproduction speed of voice information recorded in a track specified by the track reproduction starting position information and the track reproduction ending position information contained in the table-of-contents information recorded in a TOC area, in accordance with the reproduction speed information recorded in the track name area.

Here, "optical disc" also means, in addition to an optical disc such as a CD (Compact Disc), a magneto-optical disc such as an MD (Mini-Disc).

According to the present invention employing the above-described construction, it is possible to record reproduction speed information as well as track name information into the track name area of table-of-contents area, and to control a reproduction speed of audio information or the like for each track or for each disc, with a simple operation, by controlling a reproduction speed of audio information recorded in a track, based on the reproduction speed information recorded.

In the present invention, the above-described control means may be one which detects the track name area in which the above-described track name information has been recorded, and controls the above-described recording means so as to record the reproduction speed information after the recorded track name information in the detected track name area.

By this construction, even in an optical disc whose tracks have been edited, reproduction speed information can be set for each track afterwards, so that reproduction at the set reproduction speed is possible.

Further, in the present invention, the above-described control means may be one which detects a track name area into which track name information has not been recorded, and controls the above-described recording means so as to record the reproduction speed information into the detected track name area.

By this, even in a CD which does not have track name information, reproduction speed can be set for each track.

Further, according to the present invention, the optical disc device may further comprise switching means which can select between a reproduction mode based on the above-described reproduction speed information, and a standard reproduction mode in which reproduction is made at a standard reproduction speed.

In that case, by controlling the switching means through the above-described operating means, it is possible to determine a reproduction speed in accordance with a reproduction state, which is suitable for music broadcasting.

In addition, according to the present invention, the above-described recording means may record reproduction speed information designated by the operating means, together with disc name information, into a disc name area of table-of-contents area instead of the track name area, and the above-described control means may control the reproduction speed of the audio information recorded in the optical disc, in accordance with the reproduction speed information recorded in the disc name area.

In that case, it is possible to set a reproduction speed of audio information for all recordings on one disc.

DETAILED DESCRIPTION OF THE EMBODIMENT

An embodiment of the present invention will be described.

Here, description is given with respect to the case where, an MD, which is a magneto-optical disc, is used as an optical disc.

Figure 1:
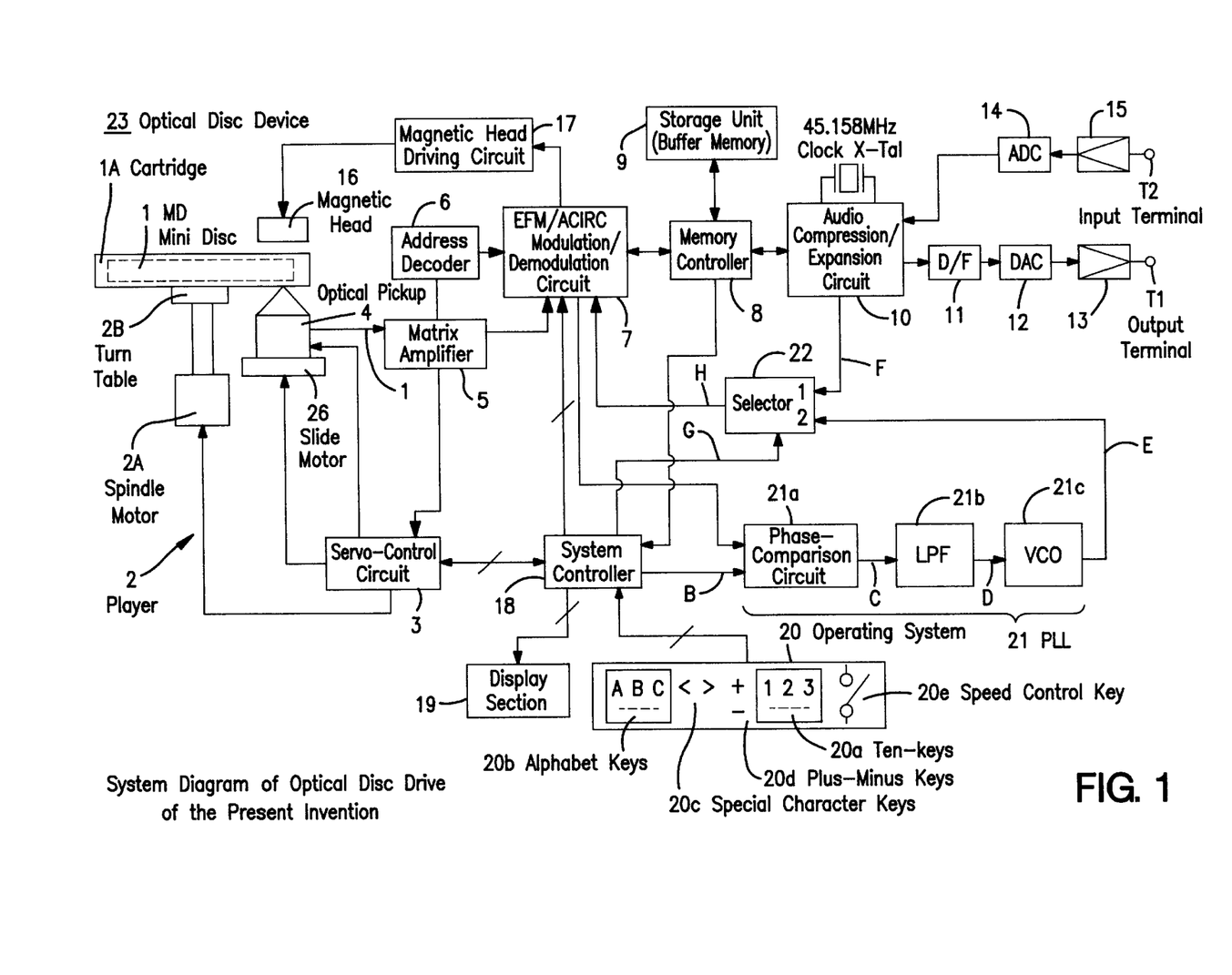
FIG. 1 is a system diagram of an optical disc device as one embodiment of the present invention.

FIG. 1 is a system diagram of an optical disc device as one embodiment of the present invention.

Here, an MD 1 has a diameter of 64 mm and track pitch of 1.6 μm, and an address (disc number) is recorded for each 11.6 ms in a wobbled pregroove. The linear velocity is 1.2–1.4 m/s, and, as a recording/reproduction method, a magnetic field modulating recording system capable of overwriting is employed. The MD 1 is rotatably provided within a cartridge 1A sized of 64 mm×72 mm×5 mm.

When the MD 1 within the cartridge 1A is loaded into the optical disc device 23, it is rotated by a turntable 2B of a player 2. Then, within the cartridge 1A, the MD 1 is fixed at its central portion onto the turn table 2B, and driven to rotate by a spindle motor 2A.

Under the cartridge 1A, there is provided an optical pickup 4, and over the cartridge 1A, there is provided a magnetic head 16. By opening a shutter provided to the cartridge 1A, a laser beam from the optical pickup 4 is irradiated upon MD 1, and the optical pickup 4 is moved in the radial direction of the MD 1 by a slide motor 26.

The magnetic head 16 is a magnetic-field-generating section for providing MD 1 with magnetic fields of north and south poles in accordance with a recorded signal.

A servo-control circuit 3 performs spindle control for the spindle motor 2A, slide control for the slide motor 26, focus control and tracking control for the optical pickup 4, and laser power control of a laser diode within the optical pickup 4, and the like. The spindle motor 2A is subject to CLV (Constant Linear Velocity) control by a spindle control circuit within the servo-control circuit 3, to be given a necessary rotational frequency.

Further, the slide motor 26 is controlled by a slide motor control circuit within the servo-control circuit 3, to move the optical pickup 4 in the radial direction of the MD 1. Further, the optical pickup 4 is controlled with respect to its focus, tracking, and ON/OFF of its laser diode by a focus control circuit, tracking control circuit and laser control circuit within the servo-control circuit 3, respectively.

First, in the construction of FIG. 1, the sequence of reproduction will be described. Recorded information of the MD 1 is read by the optical pickup 4, and supplied to EFM/ACIRC (Eight to Fourteen Modulation/Advanced Cross Interleave Reed-Solomon Code) modulation/demodulation circuit 7 through a matrix amplifier 5 and an address decoder 6. The address decoder 6 detects address information superimposed on a sine-wave signal for controlling CLV control obtained from a wobbled pregroove to decode ADIP (Address In Pregroove). Then, its output is supplied to the EFM/ACIRC modulation/demodulation circuit 7.

The EFM/ACIRC modulation/demodulation circuit 7 converts a reproduction signal from the MD 1 into compressed digital data, and demodulates EFM/ACIRC. Its output is input into a memory controller 8.

The function of the memory controller 8 is to store data from the EFM/ACIRC modulation/demodulation circuit 7 into storage circuit 9 such as buffer memory, and to read compressed digital data to send it to audio compression/expansion circuit 10 for demodulation and expansion of the compressed digital data.

The compressed digital data supplied from the EFM/ACIRC modulation/demodulation circuit 7 is stored temporarily in the storage circuit 9. The data stored in the storage circuit 9 is output at the request of the audio compression/expansion circuit 10. The storage circuit 9 also stores TOC (Table of Contents) and UTOC (User TOC) information from the MD 1.

The audio compression/expansion circuit 10 includes a crystal oscillator (X-tal) of 45.158 MHz for generating a master clock. In the audio compression/expansion circuit 10, compressed digital data from the memory controller 8 is expanded. Thus-expanded data is supplied through a D/F (digital filter) 11 to a DAC (digital-to-analog converter) 12 for conversion to analog data. The converted analog data, i.e. analog audio signal, is output to an output terminal T1 through an audio amplifier 13.

Next, a recording sequence for audio information will be described similarly based on FIG. 1.

An input signal such as analog audio signal to be recorded is input through an input terminal T2, and converted to digital data in an ADC (analog-to-digital converter) 14 through an audio amplifier 15. The converted digital data is compressed to about one fifth of its original data quantity. The audio compression/expansion circuit 10 includes an ATRAC (Adaptive Transform Acoustic Coding) modulation/demodulation circuit, and divides the audio data obtained by the analog-to-digital conversion with a time frame of 11.6 ms at maximum, for separation into a plurality of frequency bands by an MDCT (Modified Discrete Cosine Transform) operation. After the transformation into the frequency axis by MDTC, the data is thinned out utilizing the characteristics of the human auditory system to compress the data quantity. Thus-compressed data is stored into the storage circuit 9 through the memory controller 8. When the data storage quantity in the storage circuit 9 reaches the given quantity, the memory controller 8 acts to record the compressed data into the MD 1. Namely, the memory controller 8 reads the storage data from the storage circuit 9 and outputs it into the EFM/ACIRC modulation/demodulation circuit 7.

The EFM/ACIRC modulation/demodulation circuit 7 performs modulations of EFM and ACIRC, and outputs the result to a magnetic head driving circuit 17.

The magnetic head 16 is driven by the magnetic head driving circuit 17 so as to generate magnetic fields of north and south poles corresponding to the EFM signal to be recorded. This magnetic field is applied to the MD 1 through the magnetic head 16.

On the other hand, the optical pickup 4, which is positioned on the opposite side from the magnetic head 16 with respect to the MD 1, is controlled by the servo-control circuit 3 in accordance with instructions from a system controller 18 such as a computer, so as to irradiate a laser beam (high power) onto the MD 1.

Using the magnetic field from the magnetic head 16 and the laser beam from the optical pickup 4 on respective sides of the MD 1, compressed data is recorded on the MD 1 by the magnetic field modulating recording system.

On the other hand, for movement of the optical pickup 4, a slide control signal from the system controller 18 is supplied to the slide motor 26 through the servo-control circuit 3. As a result, the optical pickup 4 is made to move.

The system controller 18 is connected through a bus to the servo-control circuit 3, the EFM/ACIRC modulation/demodulation circuit 7, and the memory controller 8. As a result, control data and various data are supplied and received.

A display section 19 is a display device such as a liquid-crystal display for displaying various data from the system controller 18.

An operating section 20 is an input device section for the system controller 18, and is provided with ten-key 20a etc. The operating section 20 is further provided with alphabet keys 20b, special character keys 20c, plus-minus keys 20d, a speed control key 20e, etc.

A phase-comparison circuit 21a is supplied with LRCK (sampling signal of left and right channels of audio output) from a clock time generator of the EFM/ACIRC modulation/demodulation circuit 7, i.e., signal A generated by the clock time generator, and signal B read by the system controller 18 from the MD 1. Comparison signal C outputted from the phase-comparison circuit 21a becomes filtered signal D through LPF (low-pass filter) 21b. This filtered signal D is supplied to VCO (voltage-controlled oscillator) 21c, and converted to deviation signal E having a frequency proportional to the magnitude of (signal A–signal B).

PLL (Phase-Locked Loop) 21 comprises the above-described phase-comparison circuit 21a, LPF 21b, and VCO 21c.

The deviation signal E is supplied to a second input terminal of selector 22. On the other hand, a first input terminal of the selector 22 is supplied with signal F having a frequency of 22.5792 MHz obtained by dividing in half the frequency 45.158 MHz of the master clock generated by X-tal of the audio compression/expansion circuit 10. This signal F becomes the reference clock frequency of the optical disc device 23 at the time of standard speed reproduction.

A control terminal of the selector 22 is supplied with sampling frequency 44 kHz from the system controller 18. Further, it is supplied with clock G corresponding to a reproduction speed deviation according to a designated value of reproduction speed information received by the operating section 20.

The selector 22 selects either the reference reproduction speed or the reproduction speed received by the operating section 20, according to the clock G from the system controller 18. Signal H (either of the above two) selected by the selector 22 is supplied to the EFM/ACIRC modulation/demodulation circuit 7. As a result, the clock frequency of the time clock generator is adjusted.

As an MD 1 used for the optical disc device 23 constructed in the above-described manner, there are a premastered type for reading only, a recordable type usable for both reproduction and recording, and a hybrid type having both characteristics. The above-described UTOC area is provided with a plurality of areas into which disc name indicating a title etc. of an album and track name indicating the name of a musical piece can be recorded. Into one of these plurality of areas is recorded either a disc name or a track name. The difference between disc name areas and track name areas is identified by an address of the area.

The following example will describe the case in which these areas are used for track names.

Figure 2:
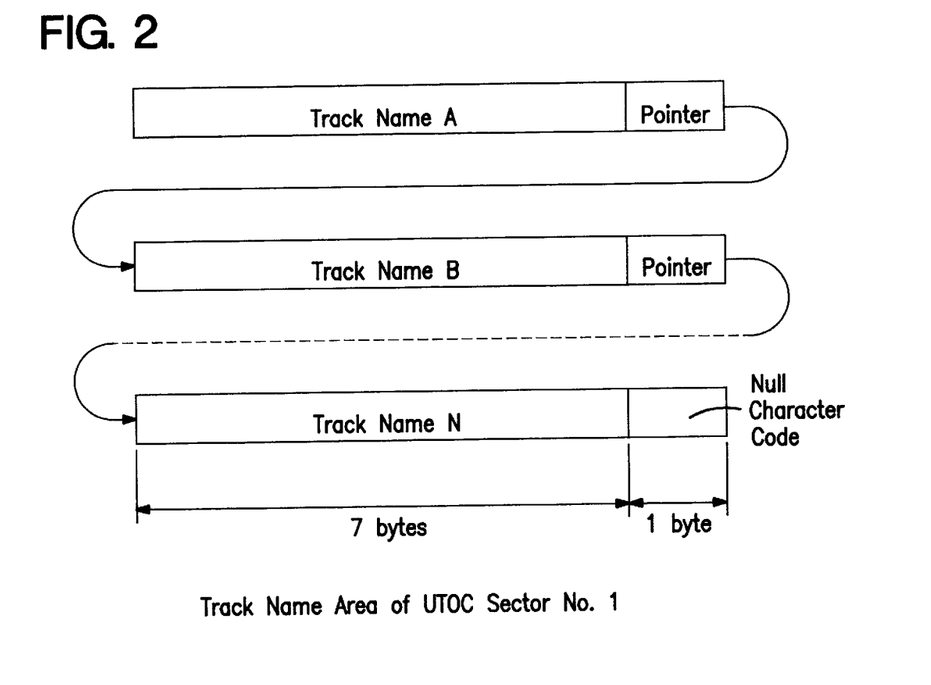
FIG. 2 is an explanatory view showing a track name area of UTOC Sector No. 1 of an MD.

FIG. 2 is an explanatory view showing track name areas of a UTOC sector in which recording is performed in accordance with one embodiment of the present invention.

In FIG. 2, each track name area consists of 7 bytes of a track name and 1 byte of a pointer, 8 bytes in total. When a track name of more than or equal to 8 bytes is to be recorded in an area with this format, the address of the continued data of the track name is indicated by a pointer. Therefore, it is indicated that the information is a track name of more than or equal to 8 bytes. When a pointer is a NULL code (Null character), it indicates an end of a track name.

Recording and reading of a track name is performed by designating a start address of the track name.

Figure 3:
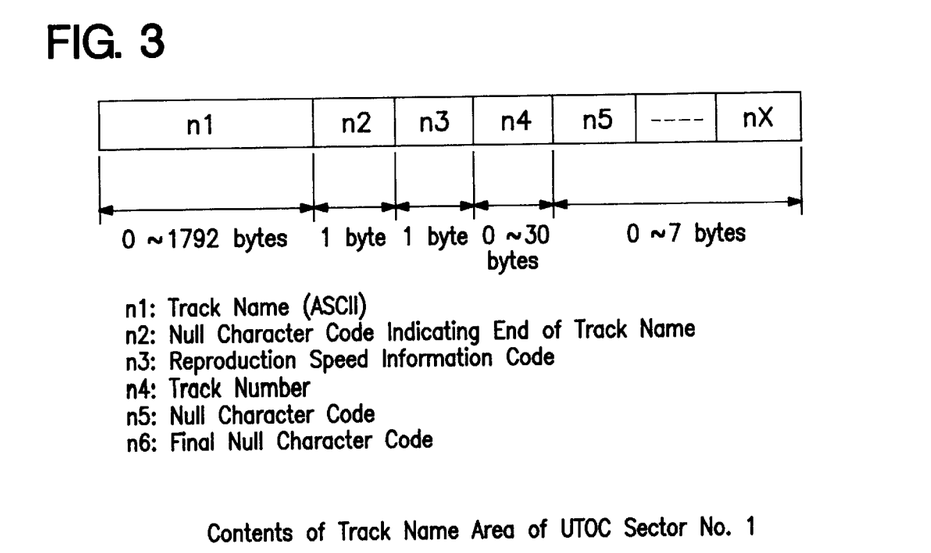
FIG. 3 is an explanatory view showing contents of the track name area of user TOC (UTOC) Sector No. 1 of an MD.

FIG. 3 is a explanatory view showing contents of a track name area for UTOC. For example, it indicates the case that, in the UTOC of an MD 1 of the recordable type, reproduction speed information is recorded.

Among a plurality of UTOC sectors, in a track name area n1 (0–1792 bytes) of UTOC sector No. 1, for example, a track name is recorded in ASCII (American Standard Code for Information Interchange) code. Next, a Null character code n2 (1 byte) is placed for indicating an end of the track name, and, following that, a code n3 (1 byte) of reproduction speed information to be described below is recorded. After that, a code n4 (1–30 bytes) indicating a track number is recorded, and following it, a Null character code n5 (1 byte) is placed for indicating the end of the reproduction speed information code and the track number. Order of recording is not specified except that the Null character code indicating the end of the information is recorded last.

"Track name A+track name B+ . . . +track name N" shown in FIG. 2 corresponds to n1 through nx in FIG. 3.

Now, operation of the optical disc device having the above-described construction will be described referring to flowcharts of FIGS. 4 and 5.

Reproduction and recording of audio signals such as a musical piece recorded in an MD 1 have been described above, and explanation for reproduction and recording of audio signal is omitted in the below explanation.

First, referring to FIG. 4, there will be described an operation in the case that reproduction speed data as reproduction speed information is recorded together with a track name in a track name area provided in the UTOC sector No. 1 of the MD 1.

When an MD 1 shown in FIG. 1 is set on a turntable 2B, the optical pickup 4 is moved to the TOC information position by the slide motor 26 controlled by the servo-control circuit 3, wherein reading of UTOC information described in FIG. 2 and FIG. 3 is performed (First Step S1).

Next, the system controller (hereinafter, referred to as "CPU") 18 judges if a track has been designated or not (Second Step S2). In the case of "NO", it waits for designation of a track. In the case of "YES", CPU 18 judges if the reproduction speed data (pitch data) has been set or not (Third Step S3). Similarly, in the case of "NO", it waits until reproduction speed data (pitch data) is set.

Here, referring to FIG. 1, an example will be described in detail with respect to track designation in the above-described Second Step S2, a method of recording reproduction speed data into the track name area in Third Step S3, and a method of recording a track name (or a disc name) into the track name area.

As for designation of a track, an operator can do it in a similar manner to the designation of a track using the conventional optical disc device.

As for recording of a track name (or a disc name) into the track name area, the operator uses the alphabet keys 20b in the operating section 20 to input a name of a musical piece, for example, "FUTARI", and thereafter, using the special character keys 20c, inputs a special character "<".

To record reproduction speed data into the track name area, the operator uses the plus-minus keys 20d to input "+" (plus) or "−" (minus), and thereafter, using the ten-key 20a, inputs a numerical value, for example 9%, corresponding to a deviation from the standard reproduction speed. Then, he uses the special character keys 20c to input ">".

When a track name (or a disc name) and reproduction speed data are recorded into the track name area as described above, the display section 19 displays the track name "FUTARI" and the reproduction speed data <−9%>, as name information. Also, as described below, the above-described two items of name information are recorded in the area n1 and the area n3 within the table-of-contents information area of the MD 1, shown in FIG. 3.

Figure 4:
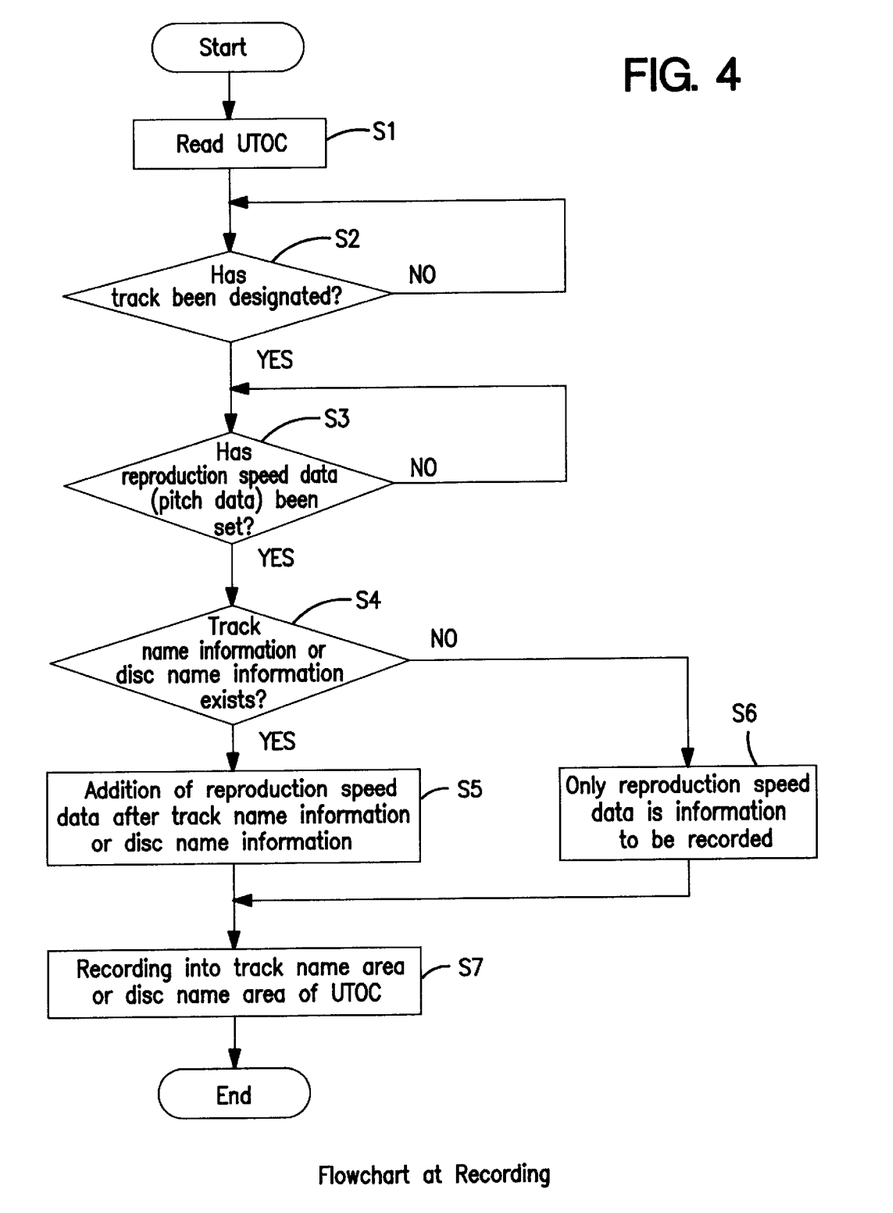
FIG. 4 is a flowchart showing operation of an embodiment of the present invention at the time of recording.
Figure 5:
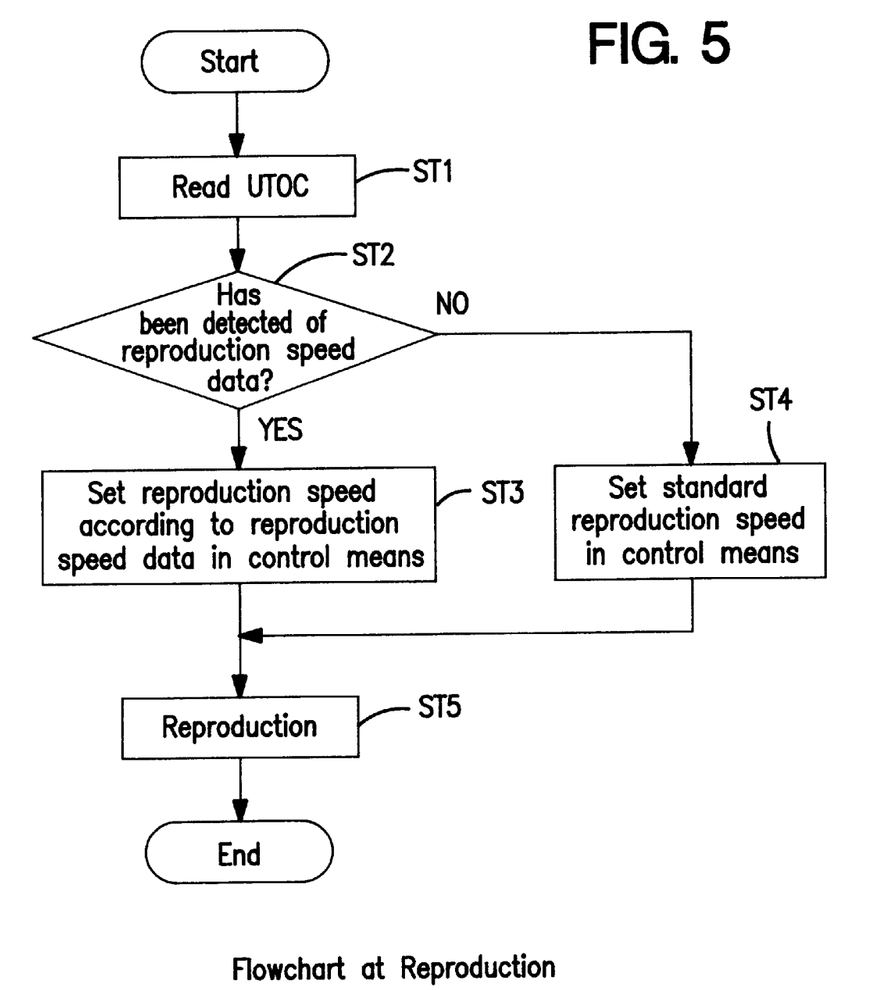
FIG. 5 is a flowchart showing operation of an embodiment of the present invention at the time of reproduction.

Returning to the flowchart of FIG. 4, description abtrack designation will be continued.

The Third Step S3, in the case of "YES", namely, in the case that reproduction speed data has been set, CPU 18 judges if track name information or disc name information has been set or not (Fourth Step S4). In the case of "YES", the process flows to Fifth Step S5, and, in the case of "NO", to Sixth Step S6.

In Fifth Step S5, as information to be recorded, the reproduction speed data ("<−9%>" in the above example) is added after the track name information or disc name information, and the process flows to Seventh Step S7.

In Sixth Step S6, only the reproduction speed data set in Third Step S3 is defined as the information to be recorded, and it goes to Seventh Step S7.

In Seventh Step 7, in the track name area (or disc name area) of the UTOC area shown in FIGS. 2 and 3, the track name information code (or the disc name information code) and the reproduction speed information code, or only the reproduction speed information code, is written into the area n1 and/or area n3 shown in FIG. 3, and this flow is ended.

Next, FIG. 5 will be described with respect to operation of reproducing the MD 1 which has a track name (or a disc name) and reproduction speed data, or reproduction speed data only, written in the track name area (or disc name area) of UTOC area in the above-described manner. The reproduction is performed while controlling reproduction speed (pitch control) in accordance with the written reproduction speed data.

First, into the optical disc device 23, there is set an MD 1 which already has reproduction speed data recorded, to read UTOC within TOC (First Step ST1).

Next, CPU 18 detects the code data indicating the reproduction speed data ("<−9%>" in the above example) from the track name area (or disc name area) (Second Step ST2). When the detection is successful, a reproduction speed is set in accordance with the detected reproduction speed data (Third Step ST3).

On the other hand, when the detection ends in failure, the standard reproduction speed is set (Fourth Step ST4).

In the Fifth Step ST5, CPU 18 controls respective parts to perform reproduction at the reproduction speed set in Third Step ST3 or Fourth Step ST4. As a result, reproduction in accordance with a suitable reproduction speed code is carried out based on the instruction of CPU 18.

Referring to FIG. 1, there will be described, in detail, an example of such a reproduction operation.

CPU 18 generates a clock G corresponding to a deviation from a sampling frequency 44.1 kHz in accordance with the state at the time of reading the reproduction speed code ("<−9%>" in the above example) recorded in the track name area, and supplies it to the selector 22.

When the clock G is at an "H" level, the selector 22 outputs (passes) deviation signal E from PLL 21, and when the clock G is at an "L" level, it outputs (passes) signal F (a reference clock at standard reproduction speed) having a clock frequency of 22.5792 MHz which is one half of the master clock frequency 45.158 MHz of the voice compression/expansion circuit 10.

Setting of such an output level of the signal G can be controlled by turning on or off the speed control key 20e provided within the operation section 20.

When the speed control key 20e is operated to make the clock G be at an "H" level, if the above-described designated reproduction speed is "<−9%>", the frequency of the clock G becomes 48.069 MHz. The sampling clock signal A outputted from the clock timing generator of the EFM/ACIRC modulation/demodulation circuit 7, and the signal B read from the MD 1 to be generated, are transformed into deviation signal E by PLL 21 comprising the phase-comparison circuit 21a, LPF 21b, and VCO 21C. When the above-described designated reproduction speed is "<+9%>", the frequency of this deviation signal E becomes 24.61 MHz. The reproduction speed is controlled according to this deviation signal E.

In the above-described embodiment, in the track name area of an MD, there is recorded, together with track name data, data indicating reproduction speed data, and track reproduction speed is controlled based on the recorded reproduction speed data. Therefore, it is possible to control reproduction speed for each musical piece.

Further, a track name area in which a track name is already recorded is detected, and a reproduction speed code is written by adding it after the track name. Therefore, even in an optical disc which has had its tracks edited, it is possible to reproduce at the reproduction speed set later for each track.

Further, as for a track name area with no track name recorded, it is possible to write a reproduction speed code in that track name area. Therefore, even when recording on a track of CD etc. with no track name, it is possible to set a reproduction speed for each track.

In addition, it is possible to select the mode in which reproduction speed data recorded in the track name area is detected and reproduction is performed according to that reproduction speed code, and the mode in which reproduction is performed at the standard reproduction speed, so that the reproduction mode can be decided in accordance with conditions of reproduction. Therefore, it is possible to obtain an optical disc device suitable for reproduction in a broadcasting station.

In the above-described embodiment, referring to FIGS. 2 and 3, there has been described the case in which a track name code and reproduction speed code are recorded in a track name area of UTOC area. However, by providing a disc name area instead of a track name area of UTOC area, and recording a reproduction speed code in the disc name area (see FIG. 4), it is possible to easily make the reproduction speed of all musical pieces etc. recorded on one disc slower or faster than the standard reproduction speed. Of course, it is possible to cause it to be reproduced at the standard reproduction speed by using the operating section 20.

As described above, according to the present invention, it is possible to record a reproduction speed code together with a track name code (or disc name code) in a track name area (or disc name area) of each track (or each disc) of an optical disc. Further, it is possible, for each track (or each disc), to perform reproduction at a reproduction speed according to reproduction speed data recorded in a track name area (or disc name area).

FIG. 1

System Diagram of Optical Disc Device of the Present Invention 1 (Mini Disc) MD
1A Cartridge
2 Player
2A Spindle Motor
2B Turn Table
3 Servo-Control Circuit
4 Optical Pickup
5 Matrix Amplifier
6 Address Decoder
7 EFM/ACIRC Modulation/Demodulation Circuit (CK-TG)
8 Memory Controller
9 Storage Circuit (Buffer Memory)
10 Audio Compression/Expansion Circuit
16 Magnetic Head
17 Magnetic Head Driving Circuit
18 System Controller
19 Display Section
20 Operating Section
20a Ten-Key
20b Alphabet Keys
20c Special Character Keys
20d Plus-Minus Keys
20e Speed Control Key
21a Phase-Comparison Circuit
22 Selector
23 Optical Disc Device
26 Slide Motor
   Clock
   Input Terminal
   Output Terminal

FIG. 2

Track Name Area of UTOC Sector No. 1

| Track Name A | Pointer |
| Track Name B | Pointer |
| Track Name N | Null Character Code |
| 7 bytes | 1 byte |

FIG. 3

Contents of Track Name Area of UTOC Sector No. 1

0–1792 bytes 1 byte 1 byte 1–30 bytes 0–7 bytes n1: Track Name (ASCII)
n2: Null Character Code Indicating End of Track Name
n3: Reproduction Speed Information Code
n4: Track Number
n5: Null Character Code
nX: Final Null Character Code

FIG. 4

Flowchart at Recording
Start
S1 Read UTOC
S2 Has track been designated?
S3 Has reproduction speed data (pitch data) been set?
S4 Track name information or disc name information exists?
S5 Addition of speed data after track name information or disc name information
S6 Only reproduction speed data is information to be recorded
S7 Recording into track name area or disc name area of UTOC
END

FIG. 5

Flowchart at Reproduction
Start
ST1 Read UTOC
ST2 Has been detected of reproduction speed data?
ST3 Set reproduction speed according to reproduction speed data in control means
ST4 Set standard reproduction speed in control means
ST5 Reproduction
END

What is claimed is:

1. An optical disc device that can record and reproduce a plurality of audio information onto and from an optical disc, comprising:

an operating means capable of designating a reproduction speed data, said reproduction speed data representing a reproduction speed deviating from a standard reproduction speed;

a recording means for recording track name information and said reproduction speed data designated by said operating means, into a table of contents area comprising table-of-contents information containing track reproduction starting position information and track reproduction ending position information for each of said plurality of audio information recorded on said optical disc; and a control means for controlling said reproduction speed of each of said plurality of audio information recorded in a plurality of corresponding tracks specified by said track reproduction starting position information and said track reproduction ending position information contained in said table-of-contents information recorded in said table of contents area, said reproduction speed being set by said reproduction speed data.

2. The optical disc device according to claim 1, wherein said control means detects a pre-recorded track name area in said table of contents area in which said track name information has been recorded, and controls said recording means so as to record said reproduction speed data after said recorded track name information in said prerecorded track name area.

3. The optical disc device according to claim 1, wherein said control means detects an unrecorded track name area in said table of contents area in which said track name information has not been recorded, and controls said recording means so as to record said reproduction speed data into said unrecorded track name area.

4. The optical disc device according to claim 1, further comprising:

a switching means for selecting one of a reproduction mode based on said reproduction speed data and a standard reproduction mode in which reproduction is made at said standard reproduction speed.

5. The optical disc device according to claim 1, wherein said recording means records said reproduction speed data designated by said operating means and said disc name information into said disc name area in said table-of-contents area, and said control means controls said reproduction speed of each of said plurality of audio information recorded in the optical disc, in accordance with said reproduction speed data recorded in said disc name area.

6. The optical disc device of claim 1, wherein each of said plurality of digital audio programs is sampled at a common sampling rate, said common sampling rate corresponding to said standard playback speed.

7. An optical disc recording and playback device for individually varying a playback speed for each of a plurality of recorded digital audio programs, the device comprising:

a recording means for recording playback speed data for said each of a plurality of recorded digital audio programs into one of a track name area and a disc name area, each of said track name area and said disc name area being located in a disc table of contents area;

an operating means for designating said playback speed data, said playback speed data representing a different playback speed from a standard playback speed; and a control means having a user interface for controlling said different playback speed for said each of a plurality of recorded digital audio programs.

8. The device of claim 7, wherein said user interface comprises an input device having keys for user entry of said playback speed data.

9. The device of claim 7, wherein said recording playback speed data for said each of a plurality of recorded digital audio programs is recorded in said track name area.

10. The device of claim 7, wherein said recording playback speed data for said each of a plurality of recorded digital audio programs is recorded in said disc name area.

11. The device of claim 7, wherein said control means comprises a selector for selecting one of said standard playback speed and said different playback speed.

12. The device of claim 7, wherein said each of a plurality of digital audio programs is sampled at a common sampling rate, said common sampling rate corresponding to said standard playback speed.

* * * * *